(12) United States Patent
Cabanne Lopez et al.

(10) Patent No.: US 9,575,273 B2
(45) Date of Patent: Feb. 21, 2017

(54) SPLITTER MODULE HOLDER AND COUPLER FOR ADDING ADDITIONAL SPLITTER MODULES TO OPTICAL FIBER DISTRIBUTION HUB

(71) Applicant: CORNING OPTICAL COMMUNICATIONS LLC, Hickory, NC (US)

(72) Inventors: Alma Delia Cabanne Lopez, Tamaulipas (MX); Cesar Alejandro de los Santos Campos, Tamaulipas (MX); Daniel Scott McGranahan, Fort Worth, TX (US); Gregory Earl McMinn, Watauga, TX (US)

(73) Assignee: Corning Optical Communications LLC, Hickory, NC (US)

( * ) Notice: Subject to any disclaimer, the term of this patent is extended or adjusted under 35 U.S.C. 154(b) by 201 days.

(21) Appl. No.: 14/448,231

(22) Filed: Jul. 31, 2014

(65) Prior Publication Data

US 2016/0033731 A1    Feb. 4, 2016

(51) Int. Cl.
*G02B 6/44* (2006.01)
*G02B 6/38* (2006.01)
*G02B 6/36* (2006.01)

(52) U.S. Cl.
CPC ........... *G02B 6/4452* (2013.01); *G02B 6/3897* (2013.01); *G02B 6/36* (2013.01); *G02B 6/445* (2013.01)

(58) Field of Classification Search
CPC ....... G02B 6/4452; G02B 6/36; G02B 6/3897; G02B 6/44; G02B 6/445; G02B 6/46
See application file for complete search history.

(56) References Cited

U.S. PATENT DOCUMENTS

| | | | | |
|---|---|---|---|---|
| 7,218,827 B2 * | 5/2007 | Vongseng | ............... | G02B 6/445 385/134 |
| 7,471,869 B2 * | 12/2008 | Reagan | ................ | G02B 6/3849 385/134 |
| 7,526,174 B2 | 4/2009 | Leon et al. | ..................... | 385/136 |
| 7,590,328 B2 * | 9/2009 | Reinhardt | ............ | G02B 6/4452 385/134 |
| 7,751,672 B2 * | 7/2010 | Smith | ..................... | G02B 6/445 385/134 |
| 8,606,067 B2 * | 12/2013 | Solheid | ................ | G02B 6/4442 385/135 |
| 2007/0147765 A1 * | 6/2007 | Gniadek | ............... | G02B 6/4453 385/135 |
| 2008/0031585 A1 * | 2/2008 | Solheid | ................ | G02B 6/4452 385/135 |
| 2010/0183276 A1 * | 7/2010 | Smith | .................. | G02B 6/4452 385/135 |

FOREIGN PATENT DOCUMENTS

CA        2602293 C    4/2012    ............. H04B 10/02

* cited by examiner

*Primary Examiner* — Daniel Petkovsek
(74) *Attorney, Agent, or Firm* — Robert L Branham

(57) ABSTRACT

A splitter module holding system and fiber distribution hub cabinet and related method are provided. The splitter module holding system is configured to add additional splitter modules to a fiber distribution hub cabinet that includes preinstalled optical fiber splitter modules. The splitter module holding system is configured to receive at least four splitter modules and to support the at least four splitter modules from a surface within a fiber distribution hub cabinet that is distinct and separate from the position and location of the preinstalled optical fiber splitter modules.

13 Claims, 10 Drawing Sheets

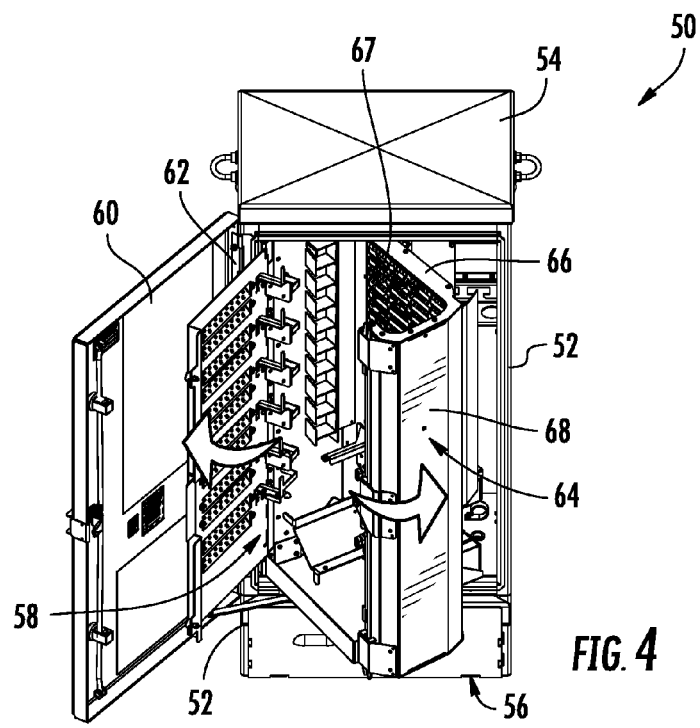
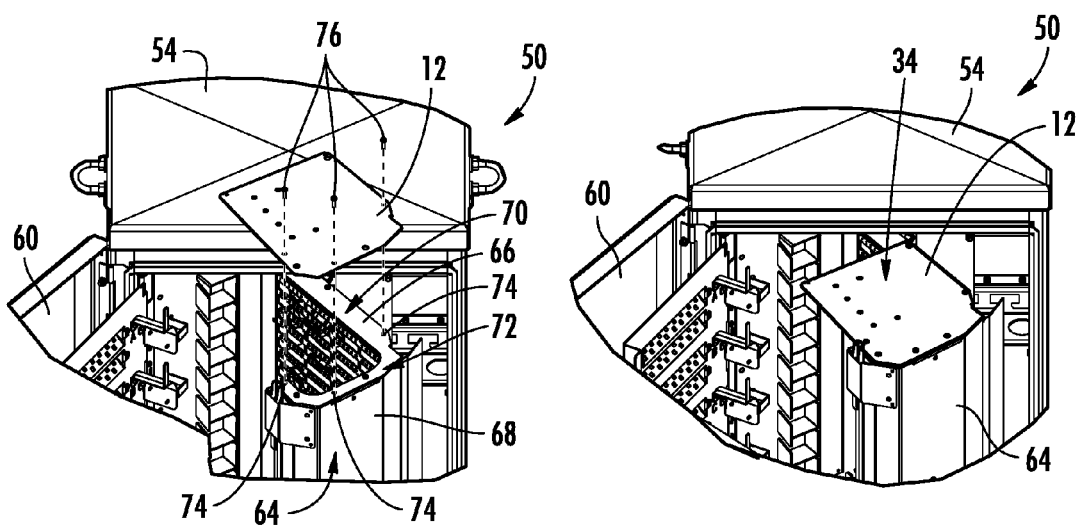

SPLITTER MODULE HOLDER AND COUPLER FOR ADDING ADDITIONAL SPLITTER MODULES TO OPTICAL FIBER DISTRIBUTION HUB

BACKGROUND

The disclosure relates generally to fiber optic networks and more particularly to equipment housings for use within fiber optic networks. Within a fiber optic network, various upstream or input fibers carry optical signals including data to be delivered to multiple downstream facilities, users or customers. In some fiber optic networks, a splitting device or splitter module receives an input fiber and splits or distributes the optical signals within the input fiber into a plurality of output fibers that each deliver the signal to the appropriate downstream facility, customer or user. A fiber distribution hub or cabinet provides the housing and support for the splitter modules, the input fibers, the output fibers, the splicing hardware, signal distribution hardware, fiber routing and storage equipment, etc. that operates to delivering data service to the network of an end user.

SUMMARY

One embodiment of the disclosure relates to a modular optical fiber distribution housing that includes a plurality of walls, and each of the plurality of walls includes an inner surface that together define an interior compartment of the housing. The housing includes a preinstalled, primary splitter module support rack, and the primary splitter module support rack is supported within the interior compartment from a first inner surface of a first wall of the plurality of walls and supports at least one preinstalled splitter module. The housing includes a secondary splitter module holder supporting at least one additional splitter module, and the secondary splitter module is coupled to and supported from a second inner surface of a second wall of the plurality of walls within the interior compartment.

An additional embodiment of the disclosure relates to a splitter module holding system configured to receive at least four splitter modules and to support the at least four splitter modules from a surface within a fiber distribution hub cabinet. The system includes a coupling plate including a coupling structure configured to engage the surface of the fiber distribution hub cabinet. The system includes a splitter module holder configured to receive the at least four splitter modules. The splitter module holder includes a plurality of walls forming a box and an interior compartment defined by inner surfaces of the plurality of walls. The holder includes an entrance opening defined in a first wall of the plurality of walls, and the entrance opening has a width and a length, and the length is greater than the width. The coupling plate is coupled to the splitter module holder such that the coupling structure is located laterally displaced from the entrance opening along an axis defined by the length of the entrance opening.

An additional embodiment of the disclosure relates to a splitter module holding device configured to receive at least four splitter modules and to support the at least four splitter modules from a surface within a fiber distribution hub cabinet. The device includes an elongate mounting plate and a row of at least four splitter module mounting openings formed through the elongate mounting plate. Each mounting opening has a length and a width, and the length is greater than the width such that a single splitter module fits through each mounting opening. The device includes a plurality of fastener holes located between each adjacent splitter module mounting opening of the row of at least four splitter module mounting openings. The device includes a first arm extending away from a right end of the elongate mounting plate and a first mounting flange extending from the first arm substantially parallel to and spaced from the elongate mounting plate. The device includes a second arm extending away from a left end of the elongate mounting plate and a second mounting flange extending from the second arm substantially parallel to and spaced from the elongate mounting plate.

An additional embodiment of the disclosure relates to a method of increasing the number of splitter modules located within a preexisting fiber distribution cabinet having a preexisting interior compartment and a preexisting splitter module support rack supported from a first surface within the cabinet and holding a plurality of preexisting splitter modules. The method includes providing a secondary splitter module holder and opening a door of the fiber distribution cabinet to access the interior compartment including the preexisting splitter module support rack and the plurality of preexisting splitter modules. The method includes coupling the secondary splitter module holder to a second surface within the fiber distribution cabinet, the second surface being different and spaced from the first surface. The method includes coupling a first additional splitter module to the secondary splitter module holder, and coupling a second additional splitter module to the secondary splitter module holder.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4 is a perspective view of a fiber distribution hub cabinet according to an exemplary embodiment.

FIG. 5 is an exploded perspective view of a portion fiber distribution hub cabinet showing attachment of the mounting plate of FIG. 3 according to an exemplary embodiment.

FIG. 6 is a perspective view of a perspective view of a perspective view of a portion fiber distribution hub cabinet showing the mounting plate of FIG. 3 coupled to a structure within the cabinet according to an exemplary embodiment.

DETAILED DESCRIPTION

Referring generally to the figures, various embodiments of a splitter module holding system configured to add additional splitter modules within a fiber distribution hub cabinet are shown. In general, the splitter module holding systems discussed herein are configured to allow the addition of extra splitter modules to an interior compartment of the fiber distribution housing without the need to increase the overall volume or footprint of the housing and/or without the need to install a larger fiber distribution cabinet to support the larger number of splitter modules. In various embodiments, the splitter module holding systems discussed herein are configured to be added to an existing, installed fiber distribution hub cabinet to increase the number output fibers within the cabinet which in turn increases the number of downstream facilities, users, customers or networks supported by the cabinet without the need to install a new, larger fiber distribution cabinet.

In various embodiments, the splitter module holding systems include a coupling device or structure that allows the splitter module holding system to be supported within the fiber distribution hub cabinet in previously unoccupied space. In addition, the splitter module holding systems are configured to be supported and positioned within the cabinet at a position that allows output fibers to be routed within the fiber distribution hub while maintaining a suitably low bend radius. Further, the splitter module holding system and coupling arrangement are shaped and configured to add additional splitter modules to the cabinet while still allowing all of the preexisting components of the cabinet, the door, adapter panels, connector panels, etc. to be accessed and function as needed.

Figure 1:
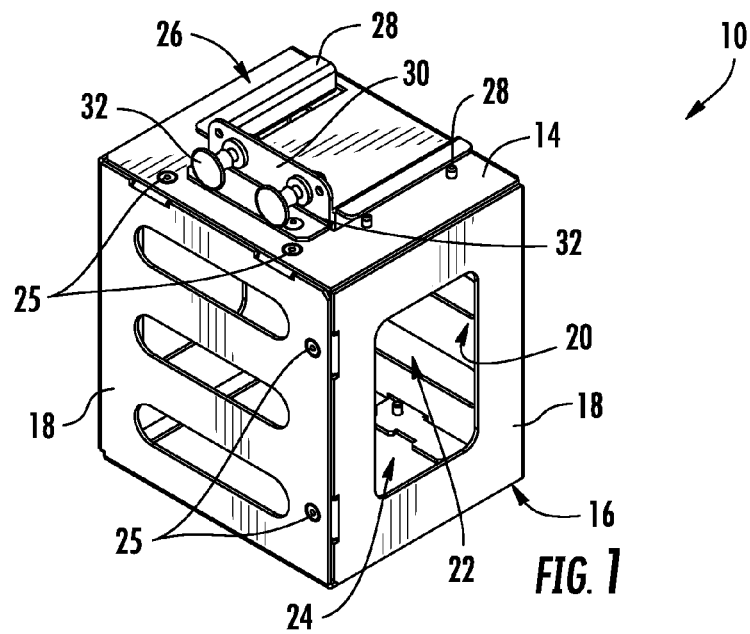
FIG. 1 is a perspective view of a splitter module holder according to an exemplary embodiment.
Figure 2:
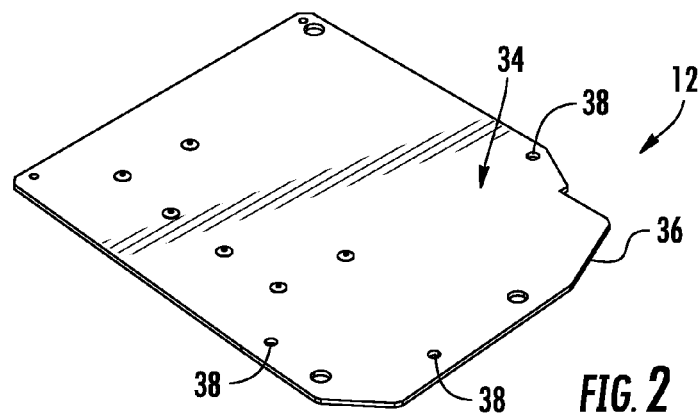
FIG. 2 is a top perspective view of a mounting plate according to an exemplary embodiment.
Figure 3:
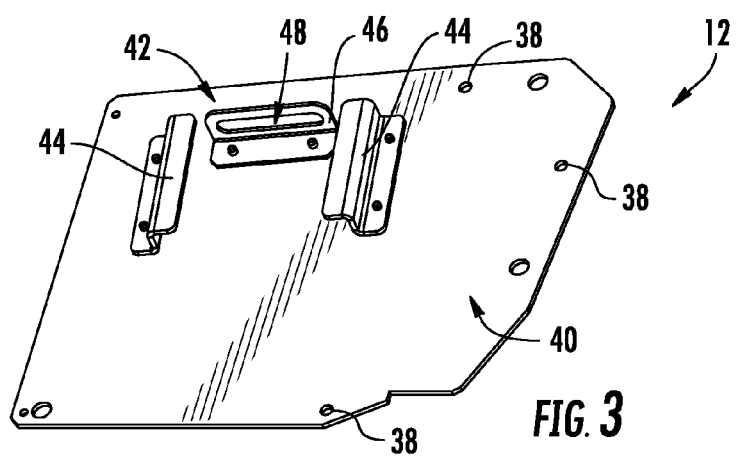
FIG. 3 is a bottom perspective view of a mounting plate according to an exemplary embodiment.

Referring to FIGS. 1-3, a splitter module holding system is shown according to an exemplary embodiment. In this embodiment, the splitter module holding system includes a splitter module holder 10 and coupling plate, shown as mounting plate 12. Splitter module holder 10 includes a top wall 14, a bottom wall 16 and a plurality of sidewalls 18. In the embodiment shown, the walls of splitter module holder 10 form a substantially rectangular or square shaped box (e.g., a cuboidal or rectangular prism shaped structure in which the walls form angles of 90 degrees plus or minus 10 degrees with each other), and the inner surfaces 20 of the walls of splitter module holder 10 define an interior chamber or compartment 22 sized to receive one or more splitter modules as shown in more detail below. In addition, bottom wall 16 includes an entrance opening 24 through which splitter modules are passed into interior compartment 22 to be supported by holder 10. In the embodiment shown, the walls of splitter module holder 10 are rigidly fixed together via a plurality of fastening devices, shown as screws 25, to form a box of a fixed size, sized to hold a preselected number of splitter modules (e.g., four or more splitter modules as discussed below).

Splitter module holder 10 includes an attachment structure, shown as attachment structure 26, coupled to the outer surface of upper wall 14. Attachment structure 26 includes at least two support rails 28 extending substantially parallel to the lateral edges of holder 10 and substantially perpendicular to the front and rear planes defined by the front and rear sidewalls 18. Attachment structure 26 also includes a fastener support wall 30 that supports at least one fastener, shown as captive support posts 32. In this embodiment, fastener support wall 30 is located between support rails 28 and extends substantially perpendicular to rails 28 along the outer surface of top wall 14, and captive support posts 32 extend through and are supported by fastener support wall 30. In the embodiment shown captive support posts 32 are substantially parallel to support rails 28. As explained in more detail below, attachment structure 26 is configured to engage cooperating support structures on mounting plate 12 such that splitter module holder 10 is supported within a fiber distribution hub cabinet.

Referring to FIG. 2 and FIG. 3, mounting plate 12 is shown according to an exemplary embodiment. FIG. 2 shows an upper surface 34 of mounting plate 12. Mounting plate 12 defines a peripheral edge 36 that is shaped, at least in part, to match the shape of the structure within a fiber distribution hub cabinet that mounting plate 12 is coupled to. In addition, mounting plate 12 includes a plurality of fastener holes 38 configured to receive fasteners to couple mounting plate 12 within the fiber distribution hub cabinet.

Referring to FIG. 3, mounting plate 12 includes a lower surface 40. When installed into a fiber distribution hub cabinet, lower surface 40 faces toward a bottom wall of the cabinet. Mounting plate 12 includes a receiving structure 42 coupled to and extending away from lower surface 40. In general, receiving structure 42 is configured to receive and couple to attachment structure 26 such that splitter module holder 10 is supported from mounting plate 12 within the fiber distribution hub cabinet. Receiving structure 42 includes at least two receiving rails 44 and post receiver 46 including an aperture 48. As explained in more detail below, rails 28 of holder 10 engage with and are received by receiving rails 44 of mounting plate 12, and captive support posts 32 of holder 10 are received within aperture 48 of post receiver 46 of mounting plate 12 such that holder 10 is supported from mounting plate 12 within the cabinet.

Referring to FIG. 4, a fiber distribution hub cabinet 50 is shown according to an exemplary embodiment. In general, cabinet 50 includes a plurality of sidewalls 52, an upper wall 54 and a bottom wall 56 the interior surfaces of which define an interior compartment 58. A door 60 is coupled to one of the sidewalls 52 via hinges 62 and is moveable between opened and closed positions over an entry opening that forms the opening to interior compartment 58. Cabinet 50 includes a main adapter panel 64 pivotally coupled within cabinet 50 such that main adapter panel 64 is moveable between an extended position as shown in FIG. 4 in which main adapter panel 64 extends at least part way out of compartment 58 and a storage position (see for example FIG. 9) in which adapter panel 64 is received within compartment 58 such that door 60 is permitted to close. Main adapter panel 64 includes a rear wall portion 66 and sidewall portion 68 that extends from rear wall portion 66 at approximately 90 degrees (e.g., within plus or minus 20 degrees of 90 degrees). As will be understood, main adapter panel 64 and rear wall portion 66, in particular, may support a panel of optical fiber adapters with the output legs of the splitter modules extending from the front of adapter panel 64 and the fibers of the input cables extend into the back side of the adapter panel 64. Cabinet 50 includes a subscriber/distribution field 67 located on adapter panel 64 that is configured to receive output fibers to provide network connectivity to a subscriber network. In various embodiments, cabinet 50 may be a sturdy, secure cabinet configured for outdoor use, and in another embodiment, cabinet 50 may be configured for indoor use. In one embodiment, cabinet 50 is a OptiTect® Local Convergence Cabinet, Gen III Series fiber distribution cabinet available from Corning®.

Referring to FIG. 5 and FIG. 6, attachment of mounting plate 12 to main adapter panel 64 is shown according to an exemplary embodiment. Rear wall portion 66 has an upper planar surface 70 and sidewall portion 68 has an upper planar surface 72 that each include a plurality of fastener receiving holes, shown as screw holes 74. Screw holes 74 are spaced to align with holes 38 in mounting plate 12. As shown in FIG. 6, screws 76 pass through holes 38 in mounting plate 12 into screw holes 74 coupling mounting plate 12 to main adapter panel 64. In one embodiment, screws 76 are longer than the screws originally located within screw holes 74 prior to installation of mounting plate 12. In such embodiments, the portion of mounting plate 12 that includes holes 38 act as a coupling structure that attaches holder 10 from main adapter panel 64, and a shown best in FIG. 9, the screw holes 74 and screws 76 when coupled to main adapter panel 64 are located to the right of entrance opening 24 of holder 10. Thus, in this arrangement, at least one of the holes 38 is laterally displaced relative to entrance opening 24 of holder 10 along an axis defined by the length, L1, of entrance opening 24 (shown in FIG. 7).

In this configuration, upper surface 34 of mounting plate 12 faces upper wall 54 of cabinet 50, and lower surface 40 of mounting plate 12 engages upper surfaces 70 and 72 of main adapter panel 64. Further in this arrangement, receiving structure 42 of mounting plate 12 faces toward bottom wall 56 of cabinet 50 and is positioned to receive the corresponding attachment structure 26 of holder 10. Thus, mounting plate 12 extends from upper surfaces 70 and 72 substantially perpendicular (e.g., with plus or minus 10 degrees of perpendicular) to the walls of main adapter panel 64 such that mounting plate 12 is substantially horizontally positioned within cabinet 50. In this arrangement, rails 44 of receiving structure 42 extend in a direction from the entry opening of cabinet 50 closed by door 60 toward the rear wall of cabinet 50 such that rails 44 are substantially parallel to the lateral sidewalls of cabinet 50 and also located in front of subscriber/distribution field 67.

Figure 7:
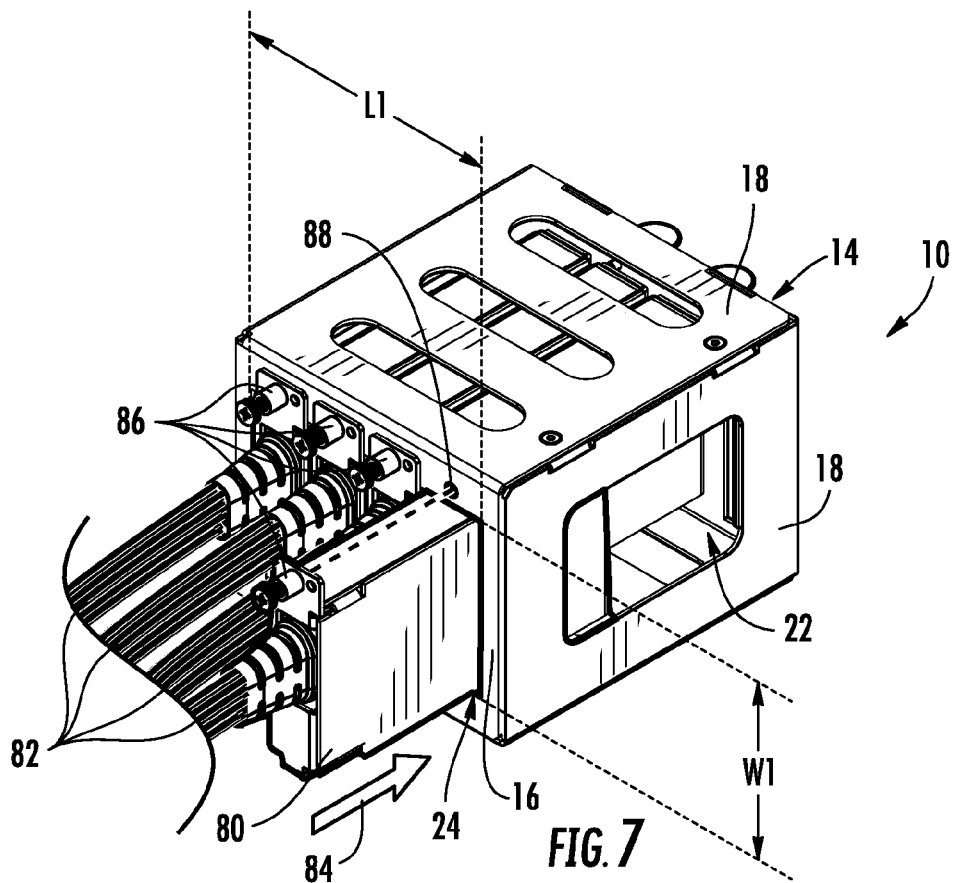
FIG. 7 is a perspective view of the splitter module holder of FIG. 1 with mounted splitter modules according to an exemplary embodiment.

Referring to FIG. 7, mounting of splitter modules 80 into holder 10 is shown according to an exemplary embodiment. As shown in FIG. 7, one or more splitter modules 80 are received through entrance opening 24 formed in bottom wall 16 of holder 10 such that splitter modules 80 are received into and are located in interior compartment 22 of holder 10. In this arrangement, output fibers 82 extend away from bottom wall 16 to be routed to the appropriate area within cabinet 50. As shown in FIG. 7, entrance opening 24 is sized such that there is a small or minimal amount of clearance between the edge that defines opening 24 and the outer surfaces of splitter modules 80. In various embodiments, opening 24 has a length, L1, and a width, W1. In various embodiments, L1 is between 3 inches and 5 inches, specifically is between 3 inches and 4 inches and more specifically is about 3.85 inches (e.g., 3.85 inches plus or minus 0.005 inches), and W1 is between 1 inch and 4 inches, specifically is between 2 inches and 3 inches and more specifically is about 2.55 inches (e.g., 2.55 inches plus or minus 0.005 inches).

To install splitter modules 80 within holder 10, splitter modules 80 are moved in the direction of arrow 84 through opening 24 and into interior compartment 22 of holder 10. In this arrangement, captive fastener 86 of each splitter modules 80 is aligned with one of the fastener holes 88 located through bottom wall 16 of holder 10. As shown in FIG. 7, fastener holes 88 are aligned along a path substantially parallel to one of the edges of opening 24 such that splitter modules 80 are arranged in the orderly and tightly-packed group shown in FIG. 7, when installed into holder 10. When splitter modules 80 are fully received within holder 10, captive fasteners 86 are threaded into the respective fastener hole 88 of holder 10 such that splitter modules 80 are securely fastened to holder 10. In the embodiment shown, holder 10 is configured to hold up to four splitter modules 80. However, in other embodiments, holder 10 may be configured to hold more than four splitter modules 80, such as 5, 6, 8, 10, 12, etc., splitter modules 80.

Figure 8:
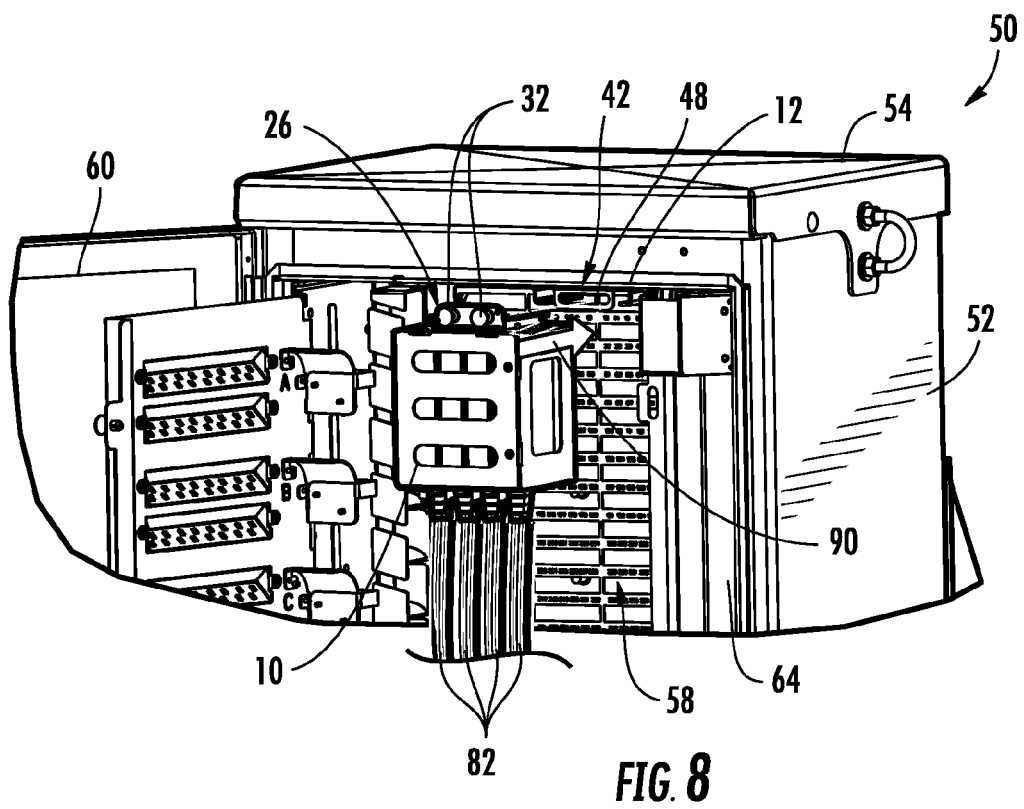
FIG. 8 is a perspective view of a portion of the fiber distribution hub cabinet of FIG. 4 showing attachment of the splitter module holder of FIG. 1 to the mounting plate according to an exemplary embodiment.

Referring to FIG. 8, in order to mount holder 10 to mounting plate 12 following installation of splitter modules 80 within holder 10, main adapter panel 64 is moved to the storage position received within compartment 58 of cabinet 50. In this position, rails 44 of mounting plate 12 are substantially parallel to the lateral sidewalls of cabinet 50 and extend in a direction from front to back within cabinet 50. Next, rails 28 of holder 10 are aligned with rails 44 of mounting plate 12, and holder 10 is moved in the direction of arrow 90 such that rails 28 engage with rails 44 to support holder 10 from mounting plate 12. Once rails 28 of holder 10 are fully engaged with rails 44, posts 32 of holder 10 are pushed forward through aperture 48 of post receiver 46 on mounting plate 12 adding additional security to the coupling between holder 10 and mounting plate 12. Thus, as can be seen, holder 10 and mounting plate 12 are configured to allow additional splitter modules 80 to be added to cabinet 50 with relative ease, for example, using simple tools such as screw-drivers.

Figure 9:
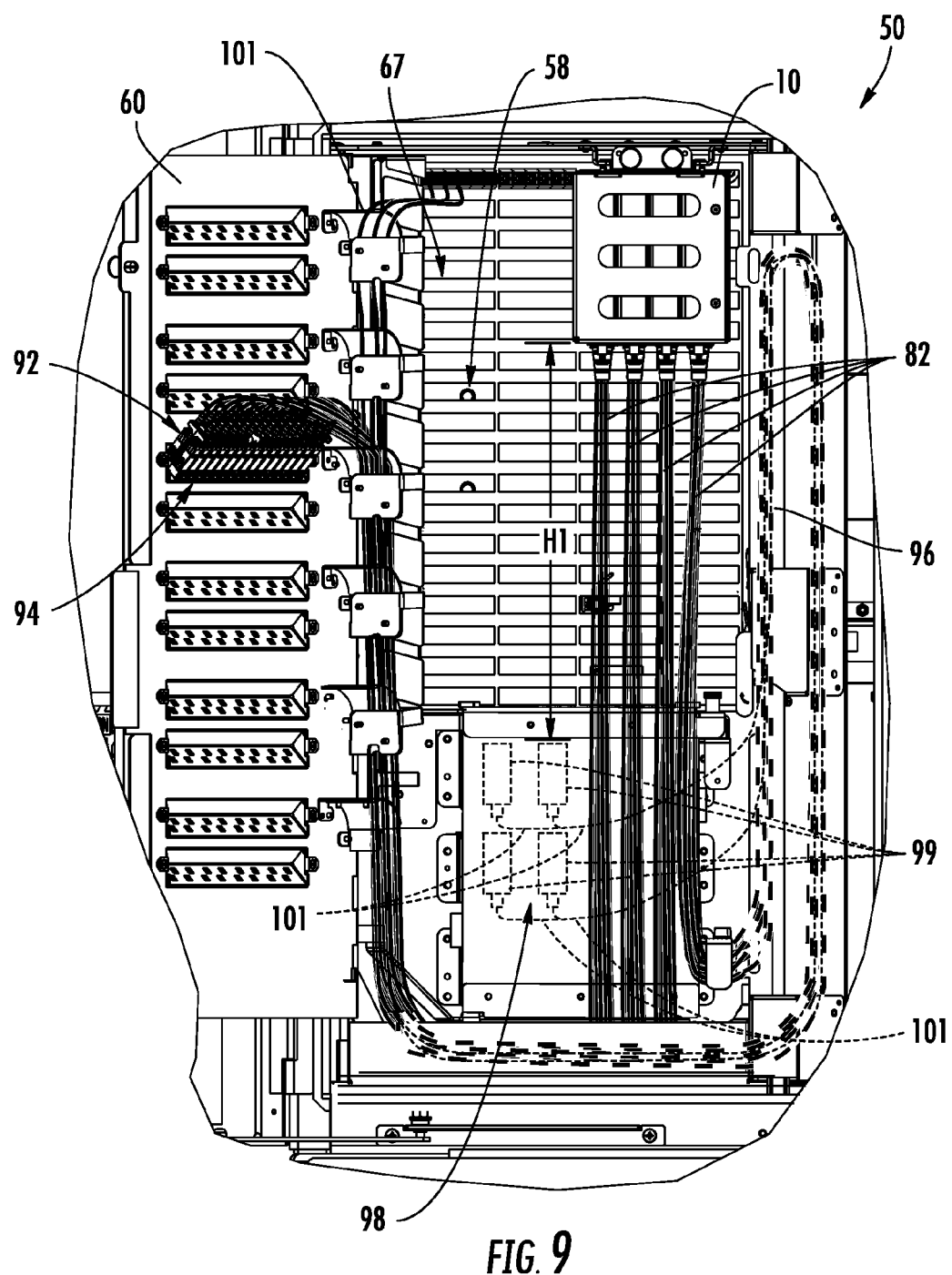
FIG. 9 is a front elevation view of the fiber distribution hub cabinet of FIG. 4 following attachment of the splitter module holder of FIG. 1 according to an exemplary embodiment.

Referring to FIG. 9, in this arrangement, once installed, holder 10 supports the additional splitter modules 80 at a position within cabinet 50 in front of subscriber/distribution field 67 with output fibers 82 extending downward away from holder 10. Once holder 10 is installed, output fibers 82 may be routed in various ways through cabinet 50, and the output fiber connectors 92 may be stored in connector parking field 94 located on the inner surface of door 60. In the embodiment shown in FIG. 9, the mounting arrangement provided by holder 10 and mounting plate 12 directs output fibers 82 downward toward the bottom wall of cabinet 50 to be routed as needed. As demonstrated in FIG. 9 by the ghost-line representations of output fibers 82, output fibers 82 may be routed through a plurality of guide structures, shown as slack storage guides 96, prior to being routed to connector parking field 94.

In addition, as will be understood, cabinet 50 includes a first, preinstalled splitter module storage location or rack, shown as preinstalled splitter module rack 98, that includes one or more preinstalled splitter modules 99 (several preinstalled splitter modules shown in ghost lines in FIG. 9) that provide the preinstalled output fibers to cabinet 50 prior to the installation of holder 10. In one embodiment, splitter module rack 98 and splitter modules 99 are supported from the rear wall or bottom wall of cabinet 50, which is distinct from holder 10 supported from main adapter panel 64. In such embodiments, holder 10 is an example of a secondary splitter module holder that may be added to cabinet 50 to increase the fiber capacity of cabinet 50. In various embodiments, because of the differential positioning of additional splitter modules 80 as compared to preexisting splitter modules 99, the routing of output fibers 82 from splitter modules 80 is different than the routing of output figures from preexisting splitter modules 99. For example, in some versions of cabinet 50 output fibers 101 from preexisting splitter modules 99 are routed horizontally from splitter modules 99 and into slack storage guides 96 prior to being routed to connector parking field 94 (or to the appropriate connector port) in contrast to the downward routing of output fibers 82.

In various embodiments, splitter module rack 98 of cabinet 50 may be sized to hold a number of splitter modules and output fibers. In various embodiments, cabinet 50 may be configured to hold and distribute 144 fibers, 288 fibers or 432 fibers from splitter modules located within splitter module rack 98 and these fibers are routed within cabinet 50 prior to the addition of splitter module holder 10. In such embodiments, splitter modules 80 supported from holder 10 may each include 32 output fibers, and in such embodiments, holder 10 is configured to hold up to 4 additional splitter modules. In such embodiments, holder 10 allows cabinet 50 to hold up to 128 extra output fibers 82 from splitter modules 80 located within the previously unoccupied space located in front of subscriber/distribution field 67 and between subscriber/distribution field 67 and door 60 in the horizontal direction without the need to install a new, larger cabinet with the optical network serviced by cabinet 50.

As shown in FIG. 9, holder 10 and the additional splitter modules 80 supported by holder 10 are located within cabinet 50 at a physical location distinct from the prebuilt and preinstalled splitter module rack 98. In the embodiment shown in FIG. 9, preinstalled splitter module rack 98 is located in the lower half of cabinet 50, and holder 10 and additional splitter modules 80 are located in the upper half of cabinet 50. Further, as shown in FIG. 9, holder 10 and additional splitter modules 80 are located in front of splitter module rack 98 (e.g., closer to the front edge of compartment 58 measured in the horizontal direction).

In various embodiments, as shown in FIG. 9, the positioning of holder 10 and of the additional splitter modules 80 supported by holder 10 are such that the distances in the vertical direction and/or in the horizontal direction between the lower most surface of holder 10 and the closest uppermost surface of an uppermost splitter module 99 within splitter module rack 98 is greater than the distance between adjacent splitter modules within splitter module rack 98. Referring to FIG. 9, the vertical distance between a lower most surface of holder 10 and the closest uppermost surface of an uppermost splitter module 99 within splitter module rack 98, shown as H1, is greater than one inch, specifically is greater than four inches and more specifically is greater than six inches. In one embodiment, cabinet 50 is a 432 fiber cabinet and in this embodiment, H1 is between 6 inches and 18 inches, specifically is between 9 inches and 13 inches, and more specifically is about 11.1 inches (e.g., 11.1 inches plus or minus 0.1 inches). In another embodiment, cabinet 50 is a 288 fiber cabinet and in this embodiment, H1 is between 3 inches and 12 inches, specifically is between 7 inches and 11 inches, and more specifically is about 9.3 inches (e.g., 9.3 inches plus or minus 0.1 inches). In another embodiment, cabinet 50 is a 144 fiber cabinet and in this embodiment, H1 is between 1 inch and 3 inches, specifically is between 1 inch and 2 inches, and more specifically is about 1.8 inches (e.g., 1.8 inches plus or minus 0.1 inches).

In various embodiments, splitter modules 80 can be a wide variety of splitter modules. In one embodiment, each splitter module 80 is a 1×32 splitter module configured to distribute signals from a single input fiber to up to 32 output fibers 82. In another embodiment, each splitter module 80 is a dual 1×16 splitter module configured to distribute signals from two input fibers to up to 32 output fibers 82. In another embodiment, each splitter module 80 is a dual 1×8 splitter module configured to distribute signals from a two input fibers to up to 16 output fibers 82. In another embodiment, each splitter module 80 is a 1×64 splitter module configured to distribute signals from a single input fiber to up to 64 output fibers 82. In various specific embodiments, splitter modules 80 may be LS Series or GEN3 splitter modules available from Corning®.

Referring to FIGS. 10-16, another splitter module holding system is shown according to an exemplary embodiment. In this embodiment, the splitter module holding system includes a splitter module holder 100 and a coupling plate, shown as mounting bracket 102. Splitter module holder 100 includes a top wall 104, a bottom wall 106 and plurality of sidewalls 108. In the embodiment shown, the walls of splitter module holder 100 form a substantially rectangular or square shaped box, and the inner surfaces 110 of the walls of splitter module holder 100 defines an interior compartment 112 sized to receive one or more splitter modules as shown in more detail below. In addition, front sidewall 116 includes an entrance opening 114 through which splitter modules are passed into interior compartment 112 to be supported by holder 100. In various embodiments, holder 100 is shaped and sized similar to holder 10 except for as discussed herein.

Figure 10:
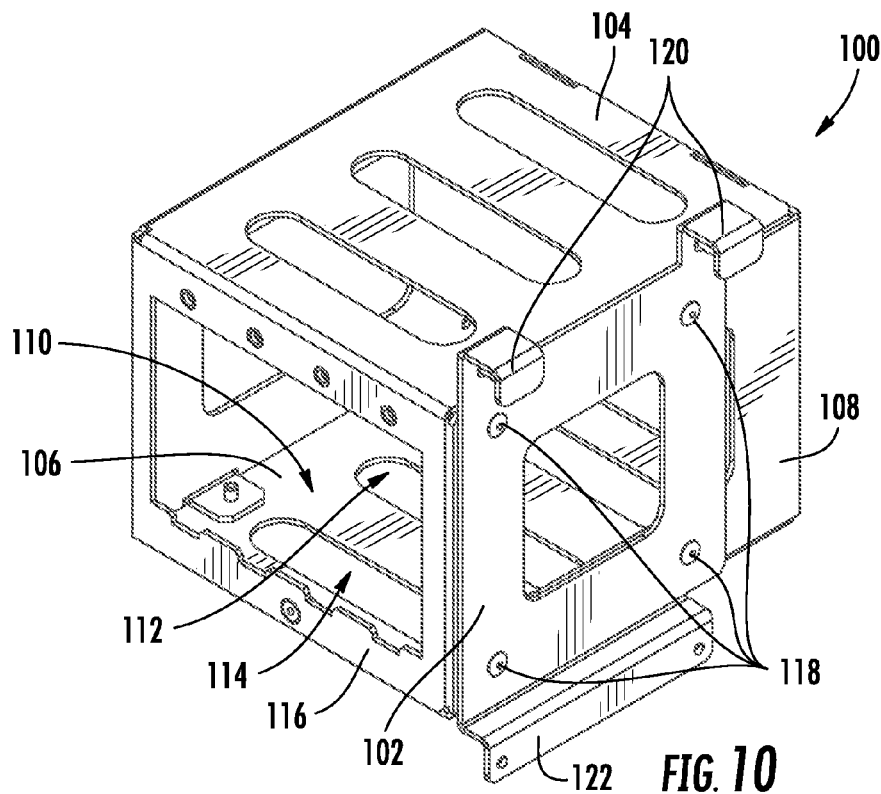
FIG. 10 is a perspective view of a splitter module holder according to another exemplary embodiment.

Mounting bracket 102 is coupled to one of the sidewalls 108 of holder 100 and positioned substantially perpendicular to front sidewall 116. As shown in FIG. 10, mounting bracket 102 is coupled to holder 100 via a plurality of fasteners 118. Mounting bracket 102 includes a first coupling structure, shown as two upper mounting hooks 120, and a second coupling structure, shown as lower mounting rail 122. As explained in more detail below, upper mounting hooks 120 and lower mounting rail 122 are configured to support holder 100 from a structure or wall within a fiber distribution hub cabinet. In the embodiment shown, mounting bracket 102 is coupled to the right sidewall of holder 100 such that upper mounting hooks 120 and/or lower mounting rail 122 are located to the right of entrance opening 114.

Figure 11:
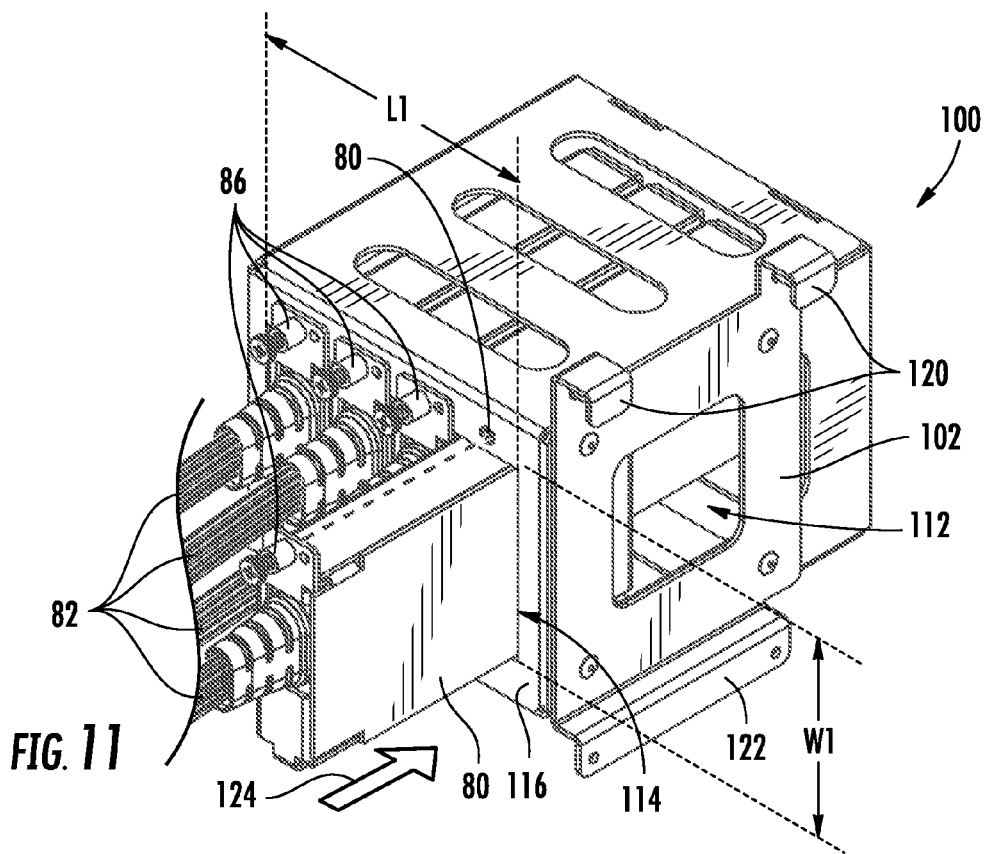
FIG. 11 is a perspective view of the splitter module holder of FIG. 10 with mounted splitter modules according to an exemplary embodiment.

Referring to FIG. 11, mounting of splitter modules 80 into holder 100 is shown according to an exemplary embodiment. As shown in FIG. 11, one or more splitter modules 80 are received through entrance opening 114 formed in front sidewall 116 such that splitter modules 80 are received into and are located within interior compartment 112 of holder 100. In this arrangement, output fibers 82 extend away from front sidewall 116 to be routed to the appropriate area within fiber distribution cabinet. In the embodiment of FIG. 11, mounting bracket 102 is coupled to holder 100 such that mounting bracket 102 and upper mounting hooks 120 are positioned laterally, and specifically to the right of splitter modules 80 within holder 100. Thus, in this arrangement, upper mounting hooks 120 are laterally displaced relative to entrance opening 114 along an axis defined by the length, L1, of entrance opening 24.

To install splitter modules 80 within holder 100 splitter modules 80 are moved in the direction of arrow 124 through opening 114 and into interior compartment 112 of holder 100. In this arrangement, captive fastener 86 of each splitter module 80 is aligned with one of the fastener holes 88 located through front sidewall 116 of holder 100 in a line substantially parallel the upper edge of opening 114. When fully received within holder 100, captive fasteners 86 are threaded into the respective fastener hole 88 of holder 100 such that splitter modules 80 are securely fastened to holder 100.

Figure 12:
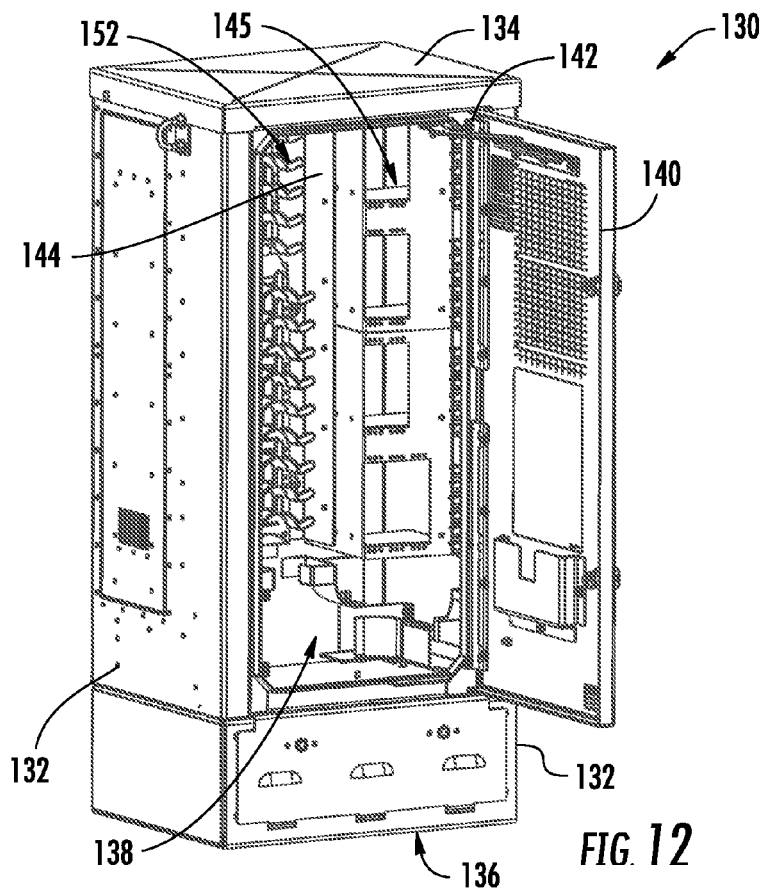
FIG. 12 is a perspective view of a fiber distribution hub cabinet according to another exemplary embodiment.
Figure 16:
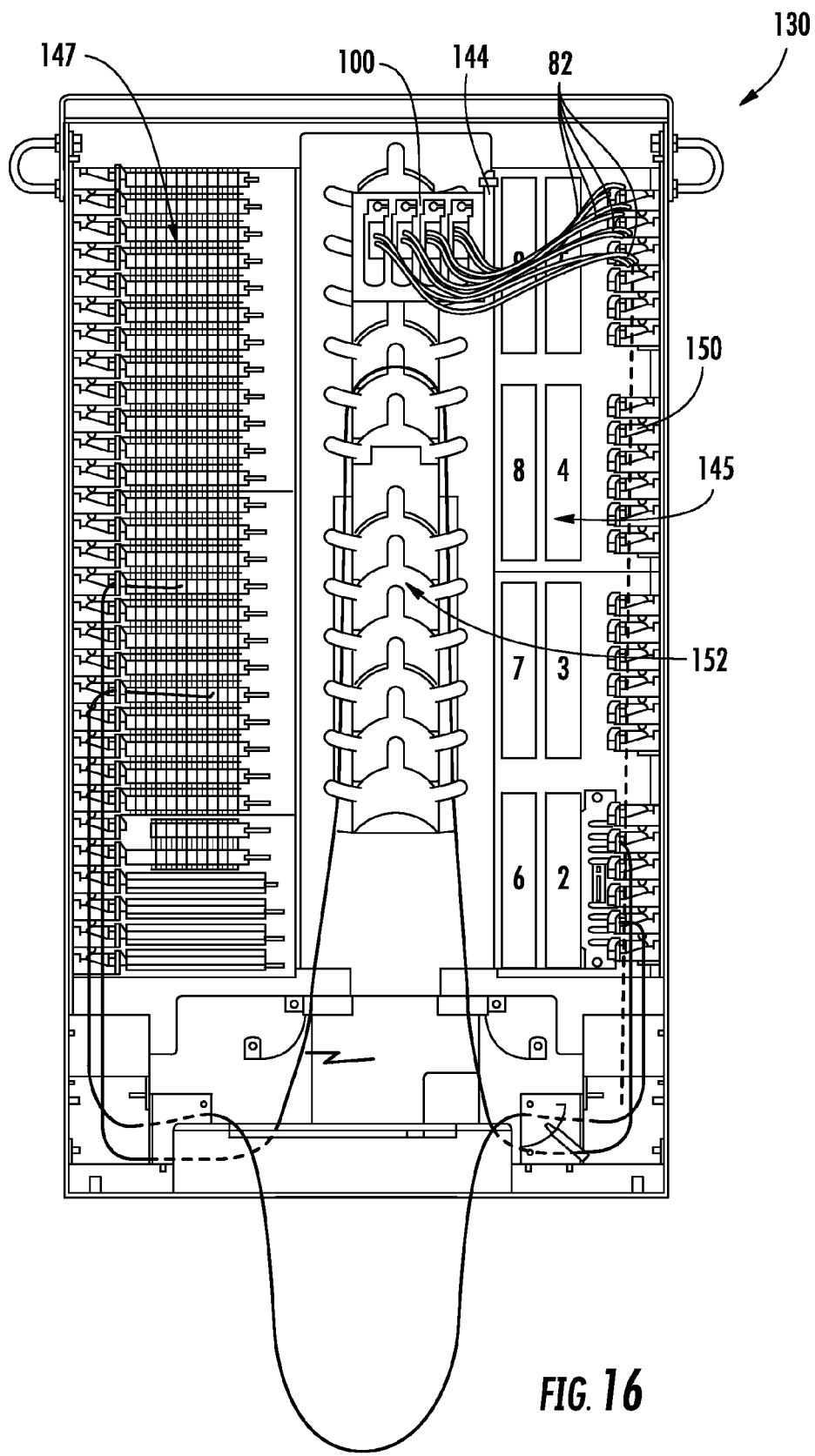
FIG. 16 is a front elevation view of the fiber distribution hub cabinet of FIG. 12 following attachment of the splitter module holder of FIG. 10 according to an exemplary embodiment.

Referring to FIG. 12, a fiber distribution hub cabinet 130 is shown according to an exemplary embodiment. In general, cabinet 130 includes a plurality of sidewalls 132, an upper wall 134 and a bottom wall 136 the interior surfaces of which define an interior compartment 138. A door 140 is coupled to one of the sidewalls 132 via hinges 142 and is moveable between opened and closed positions. Cabinet 130 includes an vertical interior sidewall 144 that is located substantially parallel to lateral sidewalls 132 and substantially perpendicular to the rear wall of cabinet 130. Cabinet 130 includes a subscriber/distribution field 147 located to the left of vertical interior sidewall 144, slack storage hubs 152 located to the left of vertical interior sidewall 144 and a splitter area 145 located to the right of vertical sidewall 144, as shown in FIG. 16. In a specific embodiment, cabinet 130 is a Fiber Distribution Hub, Gen II series cabinet available from Corning®, and is configured to hold 288 output fibers prior to addition of holder 100.

Figure 13:
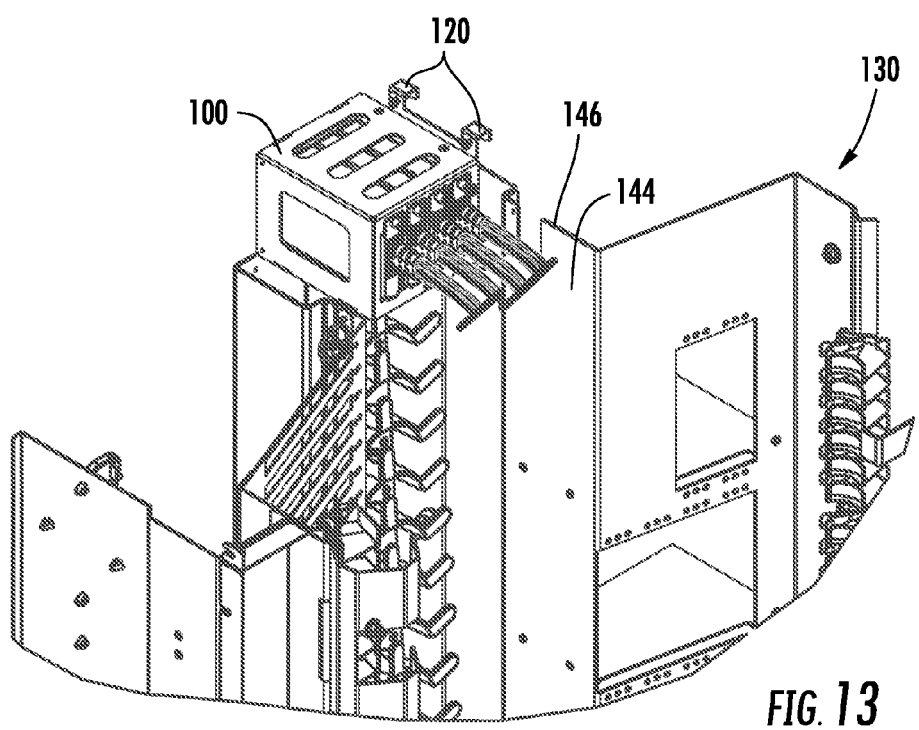
FIG. 13 is a perspective view of a portion of the fiber distribution hub cabinet of FIG. 12 showing attachment of the splitter module holder of FIG. 10 within the cabinet according to an exemplary embodiment.
Figure 14:
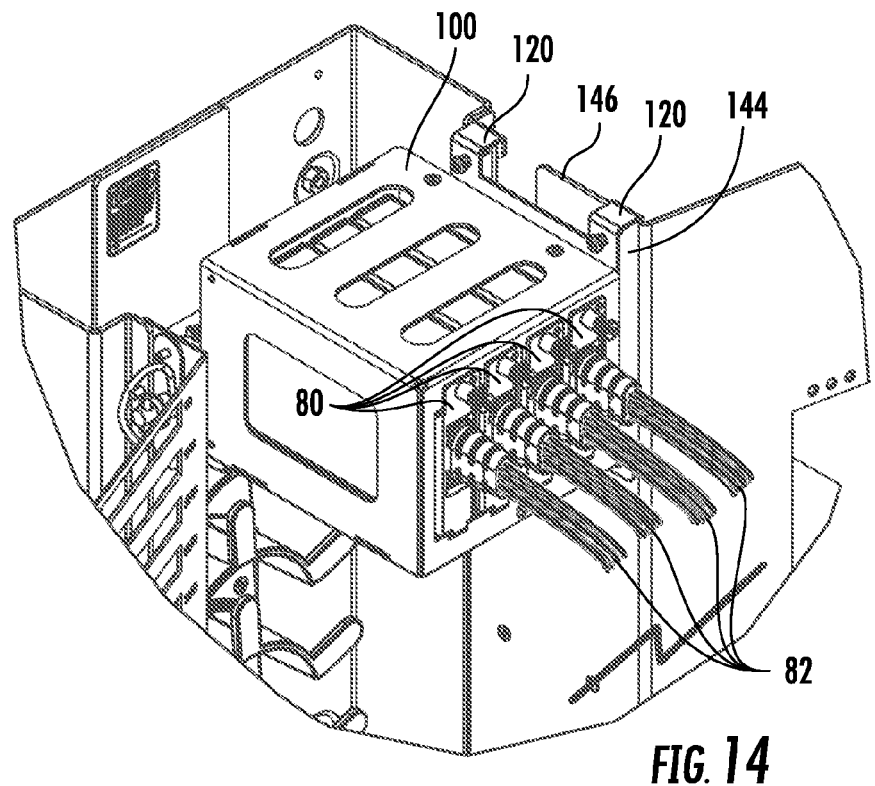
FIG. 14 is a detailed perspective view attachment of the splitter module holder of FIG. 10 within the cabinet of FIG. 12 according to an exemplary embodiment.
Figure 15:
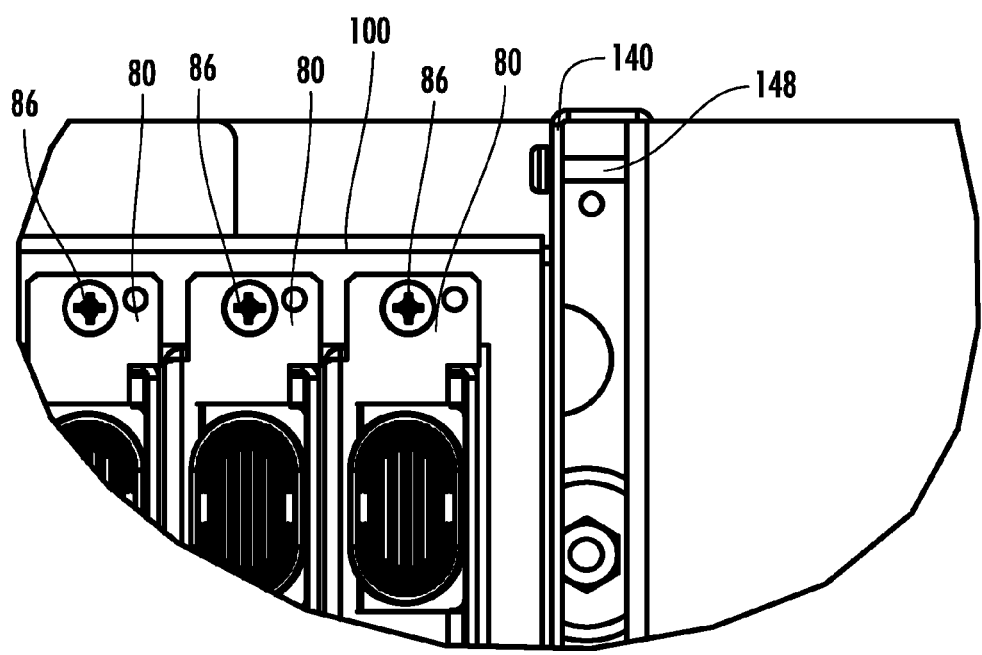
FIG. 15 is a detailed front elevation view attachment of the splitter module holder of FIG. 10 within the cabinet of FIG. 12 according to an exemplary embodiment.

Referring to FIGS. 13-15, installation of holder 100 into cabinet 130 is shown according to an exemplary embodiment. As shown in FIG. 13, vertical interior sidewall 144 includes an upper, substantially horizontal edge 146. Holder 100 and mounting bracket 102 are positioned such that upper mounting hooks 120 are located above edge 146 of sidewall 144. As shown in FIG. 14, upper mounting hooks 120 engage edge 146 such that holder 100 is cantilevered from vertical interior sidewall 144. With holder 100 in place, screws 148 are tightened within screw holes located through sidewall 144 thereby securing holder 100 in place to sidewall 144. In one embodiment, an additional two screws 148 are located through lower mounting rail 122 and fastened to sidewall 144. In this arrangement, output fibers 82 from splitter modules 80 extend outward toward the door opening of cabinet 130 and substantially in the horizontal direction prior to being routed as needed within cabinet 130. As shown in FIG. 16, after attachment of holder 100 to vertical interior sidewall 144, output fibers 82 may be routed to a guide structure, shown as slack storage guide 150, downward along the right side of cabinet 130, through slack storage hubs 152 to subscriber/distribution field 147 of cabinet 130. As show in FIG. 16, in this embodiment, in the direction between the front and back of cabinet 130, holder 100 and splitter modules 80 are located in front of at least a portion of slack storage hubs 152, and in the horizontal direction are located between subscriber/distribution field 147 and slack storage guide 150. In addition, in various embodiments, splitter area 145 that typically holds the preexisting splitter modules of cabinet 130 is located to the right of holder 100 such that holder 100 is located horizontally between the preexisting splitter modules in area 145 and subscriber/distribution field 147.

Referring to FIGS. 17-20, another splitter module holding system is shown according to an exemplary embodiment. In this embodiment, the splitter module holding system includes a splitter module holder 180. In this embodiment, splitter module holder 180 is a substantially U-shaped bracket including an elongate splitter module mounting plate or portion 182 and a pair of attachment arms 184 extending from both opposing ends of mounting portion 182. Mounting portion 182 includes a row of splitter module mounting openings, shown as a plurality of apertures 186, each sized to receive a splitter module 80, and a plurality of fastener holes 188 located adjacent to each aperture 186.

In various embodiments, each aperture 186 is sized to receive a single splitter module 80. In various embodiments, aperture 186 is sized such that there is a small or minimal amount of clearance between the edge that defines aperture 186 and the outer surfaces of splitter modules 80. In various embodiments, each aperture 186 has a length, L2, and a width, W2. In various embodiments, L2 is between 1 inch and 4 inches, specifically is between 2 inches and 3 inches and more specifically is about 2.8 inches (e.g., 2.8 inches plus or minus 0.1 inches), and W2 is between 0.1 inches and 2 inches, specifically is between 0.5 inches and 1.5 inches and more specifically is about 1 inch (e.g., 1 inch plus or minus 0.1 inches).

Each attachment arm 184 includes a first portion 190 extending away from and substantially perpendicular to mounting portion 182 (e.g., within 90 degrees plus or minus 20 degrees relative to mounting portion 182), and each attachment arm 184 includes a mounting flange 192 extending laterally outward from the respective first portion 190. In the embodiment shown, each mounting flange 192 is substantially perpendicular to the respective first portion 190 of the attachment arm (e e.g., within 90 degrees plus or minus 20 degrees relative to the respective first portion 190). Each mounting flange 192 includes a fastener opening 194. In the embodiment shown, each aperture 186 is a substantially elongate opening positioned substantially parallel to the long axis of mounting portion 182, and in this arrangement, mounting flanges 192 lie in a plane substantially parallel to a plane defined by mounting portion 182. In addition, mounting flanges 192 are spaced from mounting portion 182 by the distance or space created by first portions 190. As will be discussed below, because holder 180 is configured to be mounted horizontally within a fiber distribution cabinet, this orientation results in a low profile mounting structure utilizing the horizontal space within the cabinet.

Figure 17:
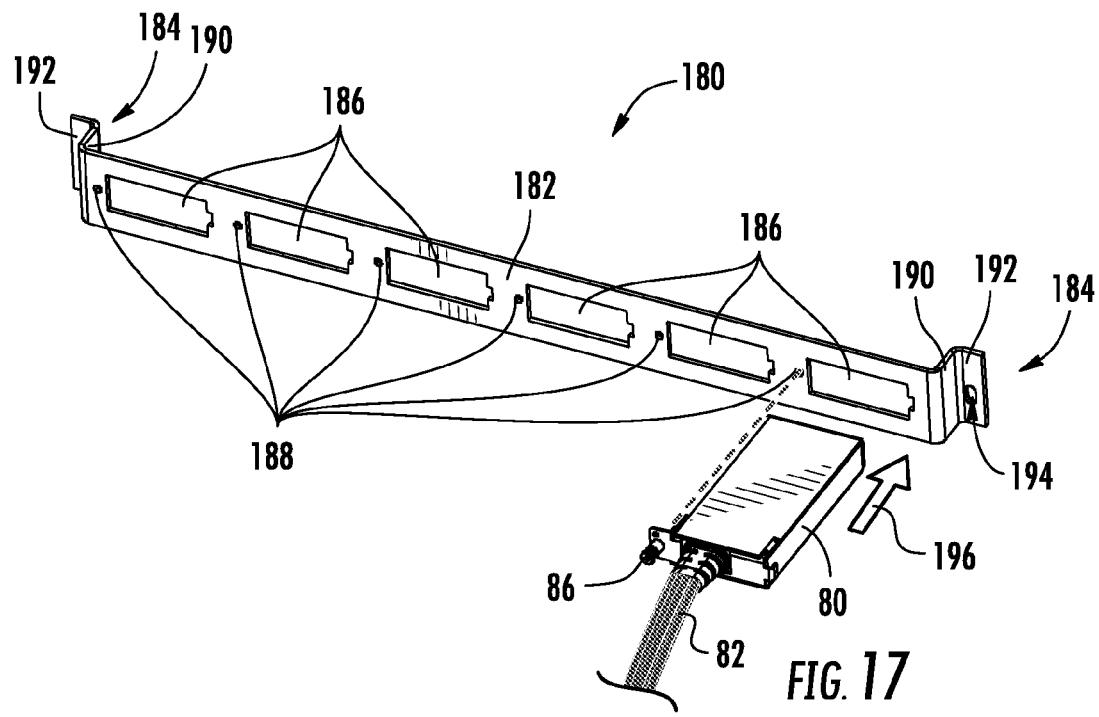
FIG. 17 is a perspective view of a splitter module holder according to another exemplary embodiment.
Figure 18:
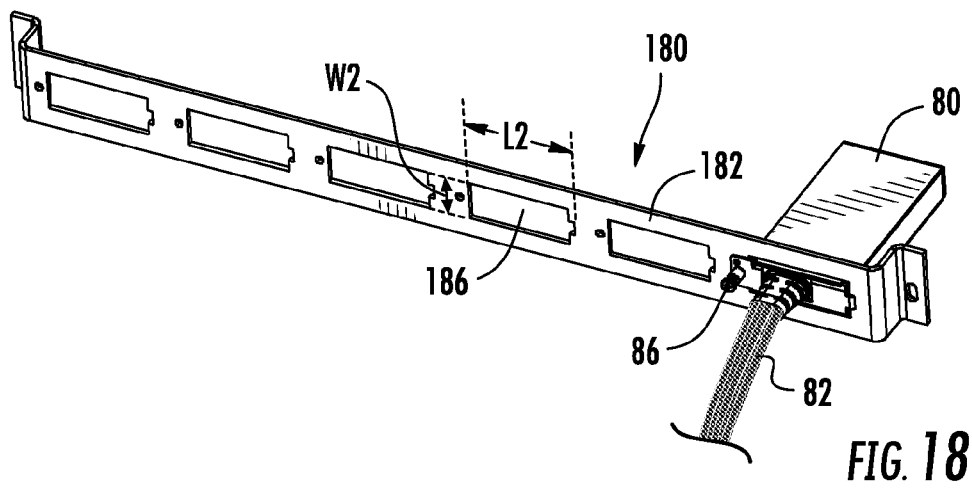
FIG. 18 is a perspective view of the splitter module holder of FIG. 17 with mounted splitter modules according to an exemplary embodiment.

As shown in FIGS. 17 and 18, one or more splitter modules 80 are received through apertures 186 formed in mounting portion 182 such that splitter modules 80 extend out of the rear surface of holder 180. In this arrangement, output fibers 82 extend away from the front surface of mounting portion 182 to be routed to the appropriate area within the fiber distribution cabinet. In this embodiment, mounting portion 182 and apertures 186 are configured such that splitter modules 80 form a row of splitter modules extending between the two mounting flanges 192 located on either side of holder 180.

To install splitter modules 80 within holder 180 splitter modules 80 are moved in the direction of arrow 196 through each aperture 186 of holder 180. In this arrangement, a captive fastener 86 of each splitter modules 80 is aligned with one of the fastener holes 188 located through mounting portion 182 adjacent each aperture 186. When fully received within holder 180, captive fasteners 86 are threaded into the respective fastener hole 188 of holder 180 such that splitter modules 80 are securely fastened to holder 180.

Figure 19:
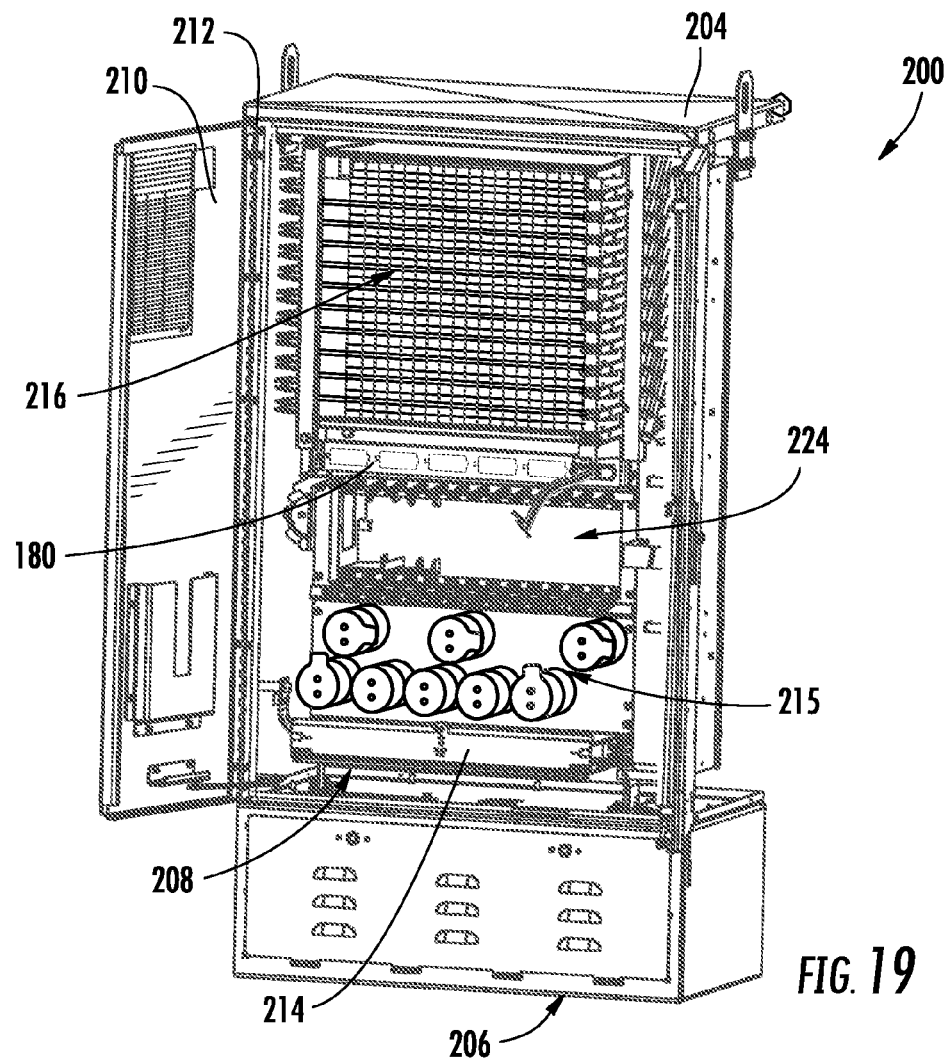
FIG. 19 is a perspective view of a fiber distribution hub cabinet according to another exemplary embodiment showing attachment of the splitter module holder of FIG. 17 according to an exemplary embodiment.

Referring to FIG. 19, a fiber distribution hub cabinet 200 is shown according to an exemplary embodiment. In general, cabinet 200 includes an upper wall 204 and a bottom wall 206 and an interior compartment 208 (sidewalls of cabinet 200 are shown removed to better show the interior components of cabinet 200). A door 210 is coupled to one of the sidewalls 202 via hinges 212 and is moveable between opened and closed positions. In one embodiment, cabinet 200 includes a splice drawer 214, region of fiber slack storage hubs 215 located above splice drawer 214 and an FDH drawer 216 located in approximately the upper half of cabinet 200. In a specific embodiment, cabinet 200 is an OptiTect® Local Convergence Cabinet, Gen I Series fiber distribution cabinet available from Corning®.

Figure 20:
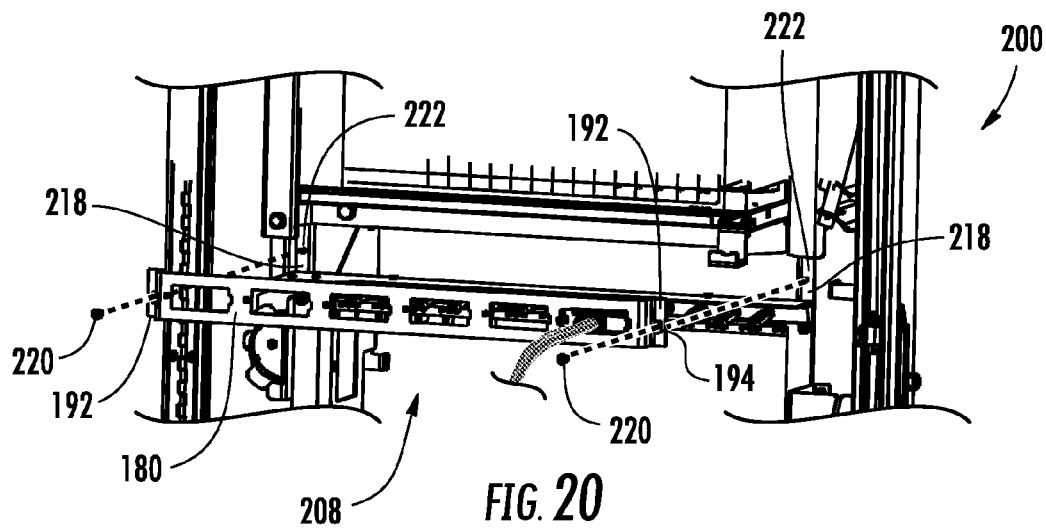
FIG. 20 is a detailed perspective view attachment of the splitter module holder of FIG. 17 within the cabinet of FIG. 19 according to an exemplary embodiment.

Referring to FIGS. 19 and 20, mounting of holder 180 within cabinet 200 is shown according to an exemplary embodiment. Holder 180 is coupled within cabinet 200 below FDH drawer 216 and above both splice drawer 214 and slack storage hubs 215. As shown in FIG. 20, holder 180 is coupled to a pair of vertically disposed forward facing surfaces 218 within cabinet 200 via screws 220. Screws 220 pass through fastener openings 194 of mounting flanges 192 and are received within screw holes 222 formed through surfaces 218. Screws 220 are tightened to support holder 180 within cabinet 200. Following mounting of holder 180 within cabinet 200, output fibers 82 are routed from splitter modules 80 through splice drawer 214. As shown in FIG. 19, cabinet 200 includes a preexisting splitter module area 224 that holds the preexisting splitter modules (e.g., preexisting splitter modules 99 as discussed above), and in this embodiment holder 180 is located above area 224 and between area 224 and FDH drawer 216.

In various embodiments, the walls of the cabinets and the components of the splitter module holding systems discussed herein are formed from a rigid material and may be formed from a metal material, such as steel or aluminum or other suitably strong metal material. In one embodiment, the splitter module holding systems discussed herein are formed from an aluminum material including an outer powder coating that can be colored as desired for a particular application.

In various embodiments, a method of increasing the number of splitter modules located within a preexisting fiber distribution cabinet is provided. In such methods the cabinet has a preexisting interior compartment and a preexisting splitter module support rack supported from a first surface within the cabinet and that holds a plurality of preexisting splitter modules. In various embodiments, the method includes providing a secondary splitter module holder. The method includes opening a door of the fiber distribution cabinet to access the interior compartment including the preexisting splitter module support rack and the plurality of preexisting splitter modules. The method includes coupling the secondary splitter module holder to a second surface within the fiber distribution cabinet, and the second surface is different and spaced from the first surface. The method includes coupling a first additional splitter module to the secondary splitter module holder and coupling a second additional splitter module to the secondary splitter module holder.

In various embodiments of the method output fibers of the first additional splitter module and the second additional splitter module are routed downward away from the secondary splitter module holder before being routed through a storage guide. In other embodiments of the method, output fibers of the first additional splitter module and the second additional splitter module are routed laterally away from the secondary splitter module holder before being routed through a storage guide. In various embodiments of the method a routing path of output fibers from the first additional splitter module and from the second additional splitter module within the cabinet is different than a routing path of output fibers from the preexisting splitter modules. In various embodiments of the method all of the preexisting splitter modules are located in the lower half of the interior compartment of the cabinet, and the secondary splitter module holder is coupled to the second surface in the upper half of the interior compartment such that the first additional splitter module and the second additional splitter module are located in the upper half of the interior compartment. In various embodiments of the method the cabinet is at least one of cabinet 50, cabinet 130 and cabinet 200, and the secondary splitter module holder is at least one of holder 10, holder 100 or holder 180 as discussed above.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A modular optical fiber distribution housing comprising:
   a plurality of walls, each of the plurality of walls including an inner surface that together define an interior compartment of the housing;
   a primary splitter module support rack supporting at least one splitter module, the primary splitter module support rack coupled to and supported by a first inner surface of a first wall of the plurality of walls within the interior compartment; and
   a secondary splitter module holder arranged a distance from the primary splitter module support rack and supporting at least one additional splitter module, the secondary splitter module holder coupled to and supported by a second inner surface of a second wall of the plurality of walls within the interior compartment, wherein the second wall is different from the first wall.

2. The modular optical fiber distribution housing of claim 1 wherein the secondary splitter module holder is located above the primary splitter module support rack within the interior compartment.

3. The modular optical fiber distribution housing of claim 2 further comprising a distribution field supported within the interior compartment and a door closing an entry opening of the interior compartment, wherein the secondary splitter module holder is located in a space between the distribution field and the door in the horizontal direction.

4. The modular optical fiber distribution housing of claim 1 further comprising at least four splitter modules supported by the secondary splitter module holder, wherein each splitter module includes a plurality of output fibers extending from each splitter module.

5. The modular optical fiber distribution housing of claim 4 wherein the output fibers of each splitter module extend downward away from the splitter module holder.

6. The modular optical fiber distribution housing of claim 4 wherein the output fibers of each splitter module extend horizontally outward away from the splitter module holder.

7. The modular optical fiber distribution housing of claim 4 wherein the secondary splitter module holder includes a plurality of walls forming a substantially rectangular box, and interior surfaces of the box define the interior chamber, wherein at least one of the plurality of walls includes an entrance opening through which all of the at least four splitter modules are received to enter the interior chamber.

8. The modular optical fiber distribution housing of claim 7 further comprising a coupling structure that is coupled to and supports the secondary splitter module holder from the second inner surface of the second wall, wherein the coupling structure is located to the right of the entrance opening of the secondary splitter module holder.

9. The modular optical fiber distribution housing of claim 7 further comprising a mounting plate, the mounting plate includes a receiving rail extending from a lower surface of the mounting plate, wherein the secondary splitter module holder includes a support rail extending from an upper surface of the secondary splitter module and, wherein the support rail engages the receiving rail such that the secondary splitter module holder is supported by the mounting plate, wherein the mounting plate includes at least one fastener hole located through the mounting plate located at a position to the right of the entrance opening of the rectangular box when the support rail is engaged with the receiving rail.

10. The modular optical fiber distribution housing of claim 7 further comprising a mounting bracket coupled to a right sidewall of the plurality of walls of the splitter module holder, wherein the mounting bracket includes at least one hook that engages the second inner surface of the second wall of the housing to support the secondary splitter module holder within the interior chamber.

11. The modular optical fiber distribution housing of claim 4 wherein the secondary splitter module holder includes an elongate mounting plate with a row of at least four splitter module mounting openings, a first attachment arm extending away from a first end of the elongate mounting plate and a second attachment arm extending away from a second end of the elongate mounting plate, opposite the first end, wherein the first attachment arm includes a first mounting flange substantially parallel to and spaced from the elongate splitter module mounting plate and wherein the second attachment arm includes a second mounting flange substantially parallel to and spaced from the elongate splitter module mounting plate.

12. The modular optical fiber distribution housing of claim 1, wherein:
the first wall is a rear wall or a bottom wall of the housing; and
the secondary splitter module holder is coupled to the second wall via a main adaptor panel of the housing.

13. The modular optical fiber distribution housing of claim 1, wherein:
the primary splitter module support rack holds and distributes 144 fibers, 288 fibers, or 432 fibers from the at least one splitter module; and
the second splitter module holder holds and distributes 128 additional fibers from the at least one additional splitter module.

* * * * *